(No Model.)

C. F. KIMBALL.
VEHICLE POLE SOCKET.

No. 485,947. Patented Nov. 8, 1892.

Witnesses

Inventor
Charles F. Kimball
By his Attorney

THE NORRIS PETERS CO., PHOTO-LITHO., WASHINGTON, D. C.

UNITED STATES PATENT OFFICE.

CHARLES FREDERICK KIMBALL, OF CHICAGO, ILLINOIS.

VEHICLE-POLE SOCKET.

SPECIFICATION forming part of Letters Patent No. 485,947, dated November 8, 1892.

Application filed February 1, 1892. Serial No. 419,953. (No model.)

*To all whom it may concern:*

Be it known that I, CHARLES FREDERICK KIMBALL, a citizen of the United States, residing at Chicago, in the county of Cook and State of Illinois, have invented a certain new and useful Improvement in Sockets for Coach-Poles; and I do hereby declare the following to be a full, clear, and exact description of the invention, such as will enable others skilled in the art to which it appertains to make and use the same.

Figure 1:
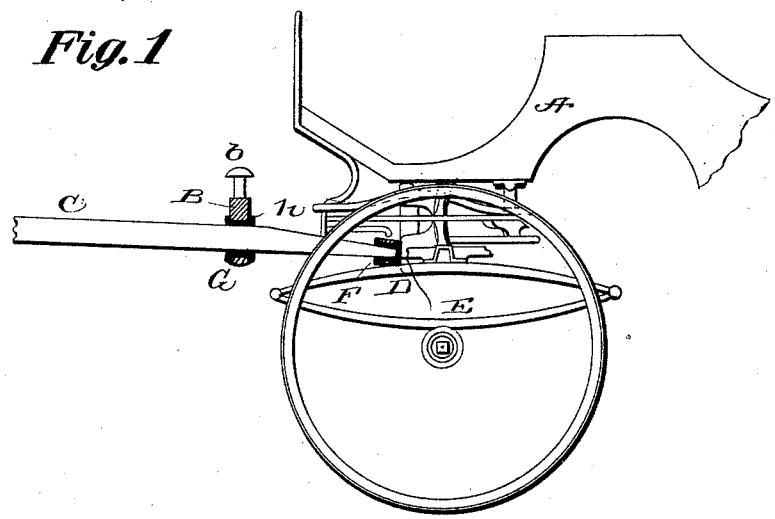
Figure 2:
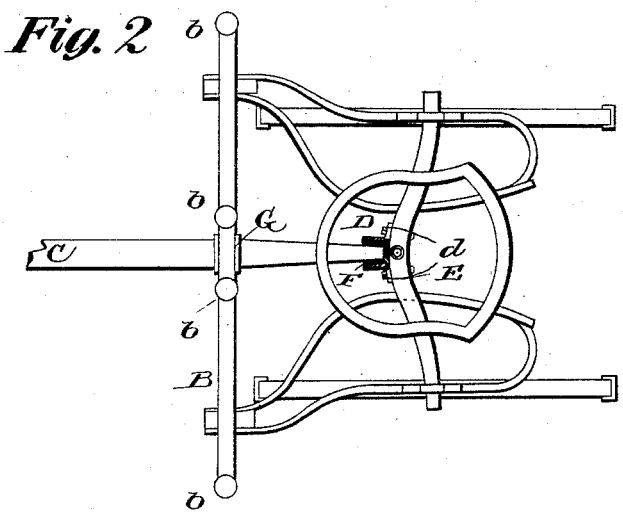
Figure 3:
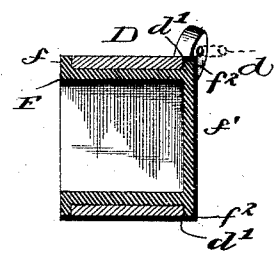
Figure 4:
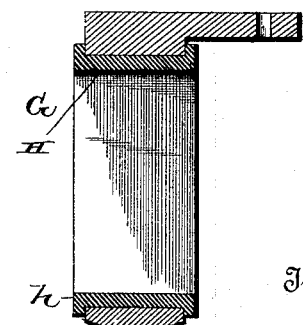

Figure 1 is a side elevation, partly in section, showing this invention as applied in use. Fig. 2 is a plan view of the structure shown in Fig. 1. Fig. 3 is a view in central section of the socket or frame and its lining for the rear of the pole. Fig. 4 is a like view of the socket attached to the draw-bar.

The object of the present invention is to prevent the rattling of the pole where it passes under the bar and into the socket on such heavy carriages as landaus, broughams, and all that class of vehicles in which a coach-pole is used; and said invention consists in providing a close-fitting and elastic socket near and another at the rear end of the seat, into which the back portion and rear end of the pole fits, all as will now be more fully set forth and explained. As now commonly used the socket or seat into which the rear end of the pole fits is composed of metal. The end of the pole fits more or less snugly into this seat and is held there in any desirable way or manner. The disadvantages of such a rough seat are that it wears and injures the rear end of the pole and the seat or socket cannot be so made but that the end of the pole will rattle when the carriage is in motion. Especially is this latter annoyance likely to occur after the carriage has been used a little. The same may also be said of the socket in the draw-bar. By my present invention this damage, as aforesaid, to the rear end, as well as to the body of the pole, and the annoyance of rattling are all prevented.

In the accompanying drawings, A indicates sufficiently the portion of the type of carriage to which the invention is applied.

B is the draw-bar, and $b$ are the roller-bolts to which the traces are attached. The seat for the rear end of the pole C is indicated at D, the front part of which is secured by bolts $d$ through it or in any desirable manner to the bottom bed E of the carriage-gear. Inside of this seat the rubber lining F is fitted in any suitable way or manner. As now shown, this lining is of like shape with the interior of the frame and has its outer edges $f$ extended or raised. The rear end $f'$ of this lining is closed to prevent the end of the pole from rubbing against the carriage-bed. By slightly compressing the lining it is easily put inside the frame, and when in this position the edges $f$ come outside of and snugly embrace the outside edge of the frame. Thus is formed the socket for the rear end of the pole, and which by its shape is adapted to receive the square or rounded portion, as the case may be, of the rear end. As seen in Figs. 2 and 3, a flange or rib $f^2$ is also formed around the rear face of the lining F, which takes into a seat $d'$ on the rear face of the socket D. It will be readily understood that when the screws or bolts $d$ are tightened this flange $f^2$ will be firmly clamped between said bearing surface or seat $d'$ and the bed E. The socket G for the body of the pole is also of metal and is fastened to and upon the draw-bar in any desired way. Inside this socket is fitted the rubber or elastic lining H, similar, except as to the closed end, to the lining F. This has flanges $h$, which closely embrace the outside edges of the socket.

Obviously the mere shape of either of the sockets or the lining thereof is not absolutely essential, for in this respect very many changes can be made without in the least changing the real nature and purpose of my invention; nor do I mean to be limited to the use of rubber for a lining of the sockets, for any material possessed of substantially the same qualities will answer the purpose. It is evident that while both of these elastically-lined sockets are designed for use at the same time that when only one is used a very satisfactory result is attained. Thus it will be seen that as my improved sockets entirely surround the pole all jarring or jolting is taken up by the elasticity thereof, giving an easy and regular motion to the vehicle. The provision of the wall $f'$ is also of considerable importance, taking up any endwise or longitudinal movement of the pole by its elasticity.

What I claim is—

1. The combination, with the running-gear, of a socket secured thereto and an elastic cup-shaped lining in said socket, a portion of which lining is between the socket and the running-gear, substantially as set forth.

2. The combination, with the carriage-gear, of the socket having a bearing-surface on its rear side and the elastic lining entered into said socket and having a flange on its rear face, engaging said bearing in the socket, and means for attaching said socket to the carriage-gear, said flange on the lining being clamped between the socket and the carriage-gear, substantially as set forth.

3. The combination, with a socket secured to the carriage-gear and a socket secured to the draw-bar, each of said sockets having an elastic hollow lining, of a pole entered into and fitting said hollows in the respective linings and an elastic cushion arranged behind the rear end of said pole, substantially as set forth.

In testimony whereof I affix my signature in presence of two witnesses.

CHARLES FREDERICK KIMBALL.

Witnesses:
D. G. McDIARMID,
J. P. WHIPPLE.